(12) United States Patent
Fekete et al.

(10) Patent No.: US 7,362,072 B2
(45) Date of Patent: Apr. 22, 2008

(54) METHOD FOR CONTROLLING TWO-PHASE STEPPING MOTOR

(76) Inventors: Ferenc Fekete, 2nd Floor, 99/A Main Street, Yung Shue Wan, Lamma Island (HK); Ming Ki Au, 5E, Broadview Terrace, 40 Cloud View Road, North Point (HK); Celement Chiu Sing Tse, Room 703, Innovation Centre, Hong Kong Science Park, Hong Kong SAR (HK); Kenny Chi Ken Lee, 2nd Floor, 115 Tung Tsz Shan Road, Tai Po, New Territories (HK); Chi Keung Tang, 2nd Floor, No. 249, Serenity Villa, Tai Po Tau, Tai Po, New Territories (HK); Man Keung Mak, 11A, Block 3, Chi Fu Fa Yuen, Pokfulam (HK); Ming Lam Ng, Room 703, Innovative Centre, Hong Kong Science Park, Hong Kong SAR (HK); Kwok Kit Mak, Room 703, Innovative Centre, Hong Kong Science Park, Hong Kong SAR (HK); Nai Lap Lee, 34K, Block 1, Broadview Ct., Shum Wan (HK)

( * ) Notice: Subject to any disclaimer, the term of this patent is extended or adjusted under 35 U.S.C. 154(b) by 171 days.

(21) Appl. No.: 11/430,056

(22) Filed: May 9, 2006

(65) Prior Publication Data

US 2006/0255761 A1 Nov. 16, 2006

Related U.S. Application Data

(60) Provisional application No. 60/679,234, filed on May 10, 2005.

(51) Int. Cl.
*G05B 19/40* (2006.01)

(52) U.S. Cl. .................................. 318/685; 318/696

(58) Field of Classification Search .............. 318/685, 318/696, 432, 434
See application file for complete search history.

(56) References Cited

U.S. PATENT DOCUMENTS

| 4,293,233 | A | * | 10/1981 | Hoffman | .................. | 400/144.2 |
| 4,683,408 | A | * | 7/1987 | Inoue et al. | ................ | 318/696 |
| 6,580,666 | B2 | * | 6/2003 | Yamaya | ....................... | 368/80 |

* cited by examiner

*Primary Examiner*—Rina Duda
(74) *Attorney, Agent, or Firm*—Leydig, Voit & Mayer, Ltd.

(57) ABSTRACT

A method of controlling a two-phase stepping motor to operate in one of a plurality of operating modes in which output of the motor behaves differently upon encountering obstacle, comprises the steps of:
  generating an electrical driving current comprising a repeating series of a positive active driving region, a first inactive driving region, a negative active driving region and a second inactive driving region;
  determining one of the duration of the active driving regions and the duration of the inactive driving regions relative to the other of the durations to thereby cause the motor to operate in a corresponding mode of the operating modes; and
  applying the driving current to the motor.

12 Claims, 13 Drawing Sheets

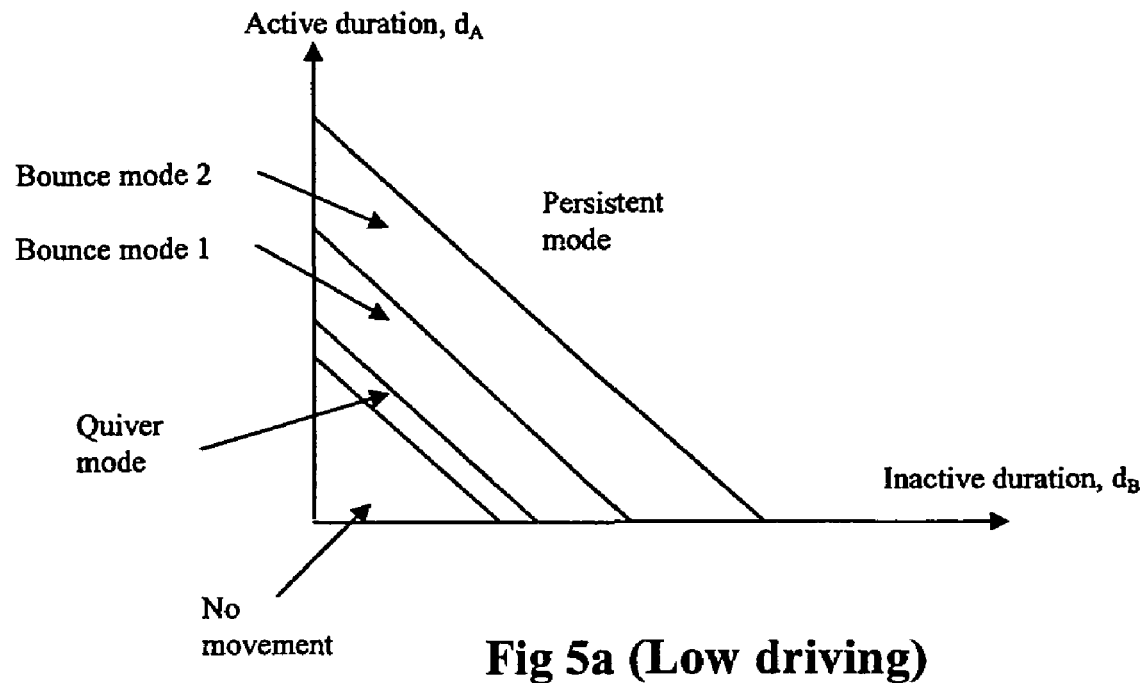
Fig 5a (Low driving)
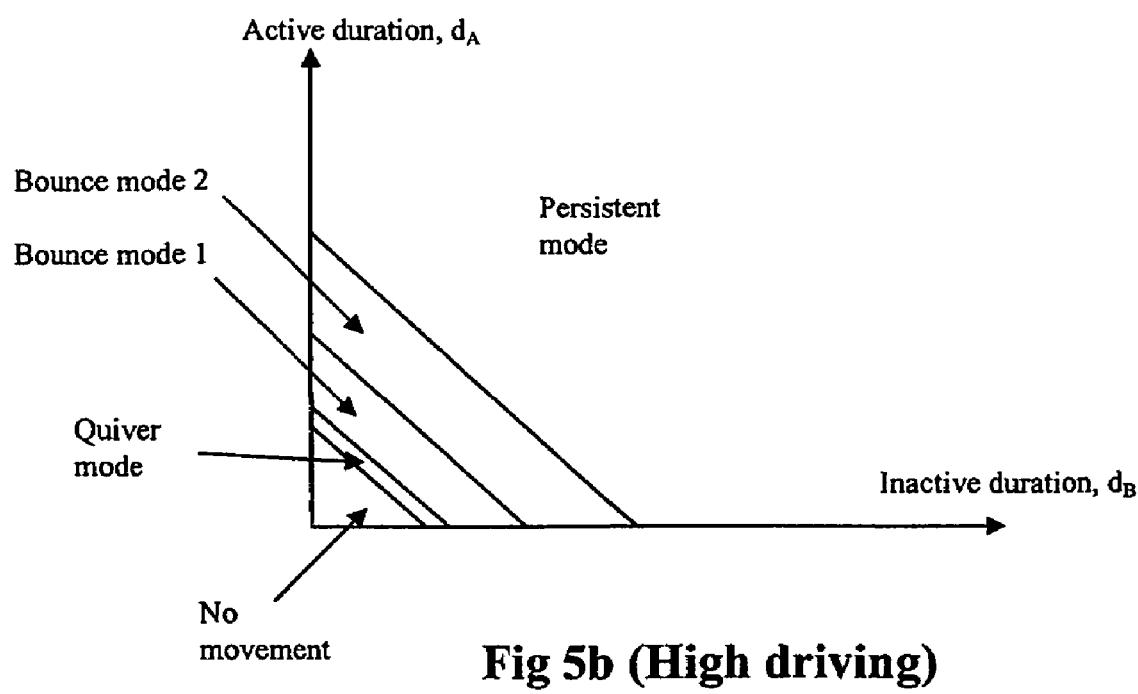
Fig 5b (High driving)

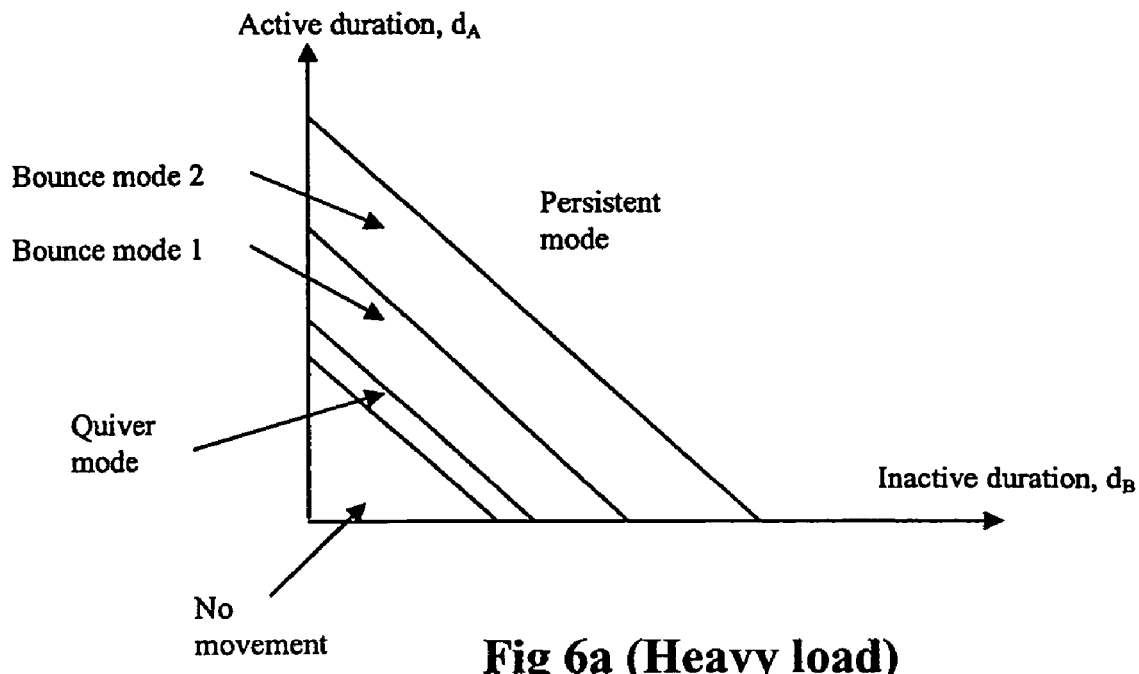
Fig 6a (Heavy load)
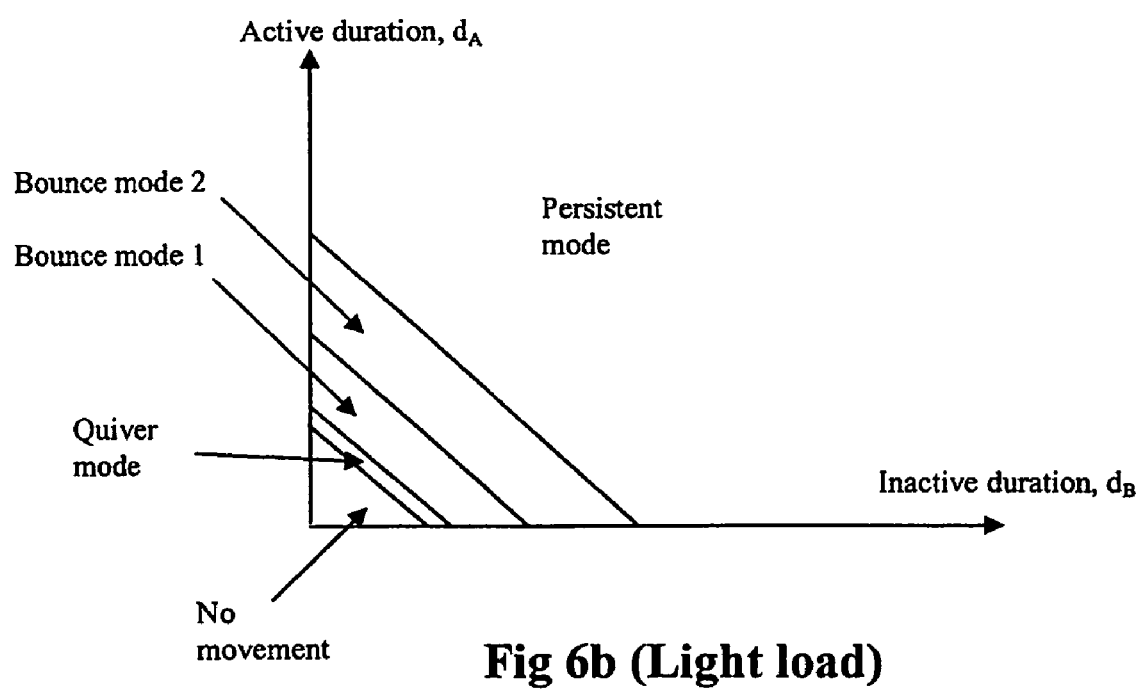
Fig 6b (Light load)

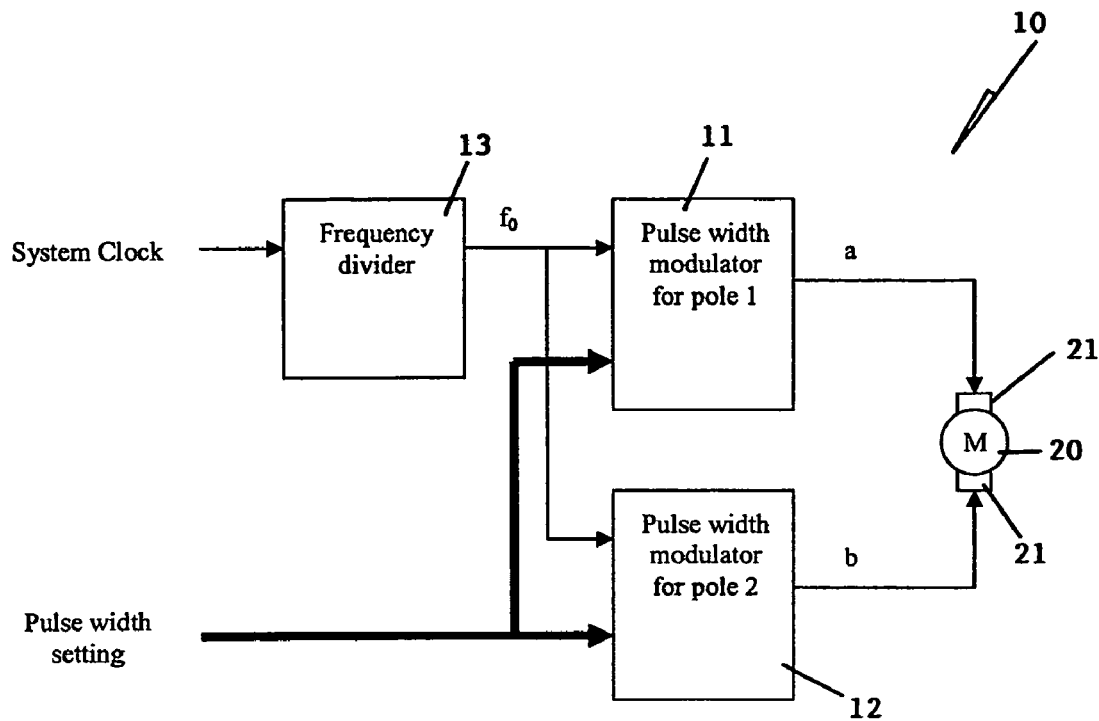
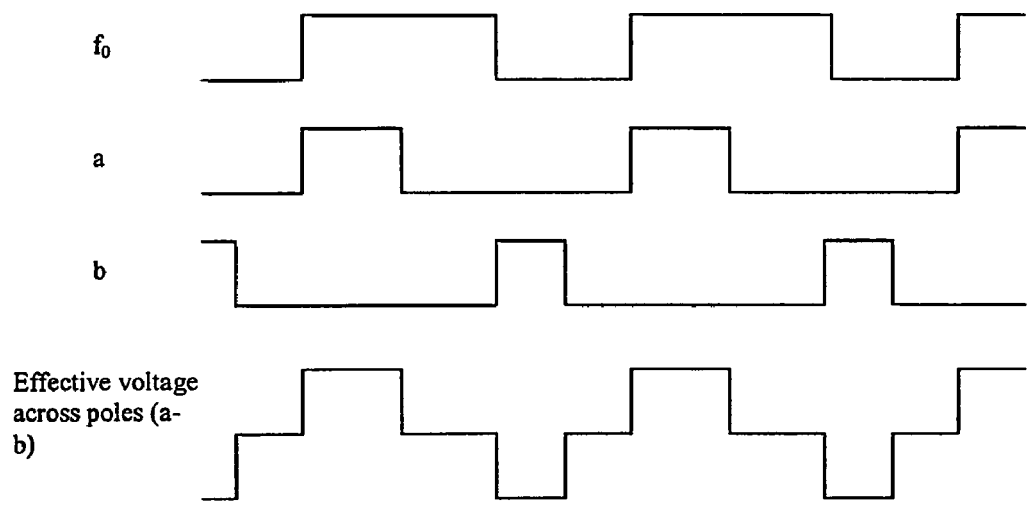
Fig 8

Persistent Mode
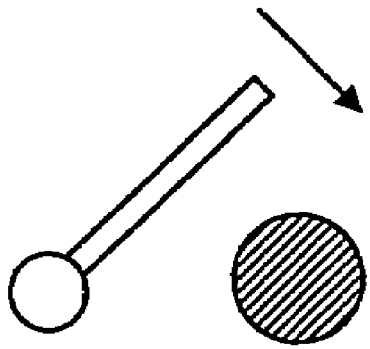
Initially, motor moves in arbitrary direction
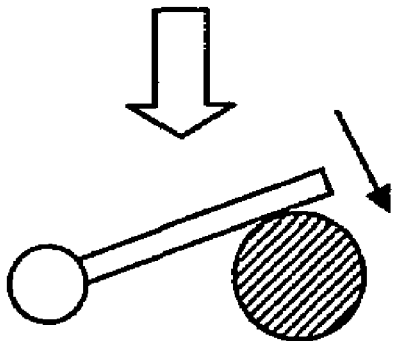
Hitting obstacle
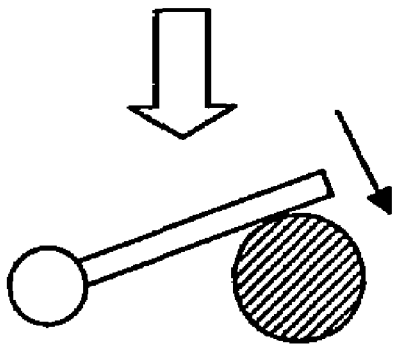
Stuffed at the position, tending to move in the same direction
Fig 9

Quiver Mode
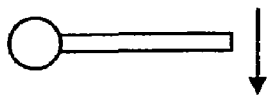
Initially, motor moves in arbitrary direction
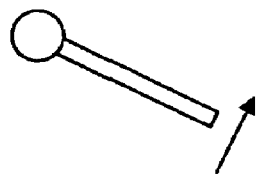
Change direction without meeting obstacle
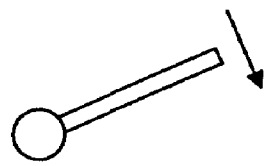
Change direction again without meeting obstacle
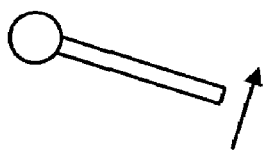
Change direction from time to time
Fig 12

METHOD FOR CONTROLLING TWO-PHASE STEPPING MOTOR

The present invention relates to a motor driving method specifically to such motor as a two-phase stepping motor.

BACKGROUND OF THE INVENTION

The most common way to drive a two-phase stepping motor is by feeding two binary phase non-overlapping electrical signals into the two poles of the motor respectively. The motor will thereby rotate at a certain speed in a single direction. The driving signals are illustrated in FIG. 1. But nevertheless all biased two-phase stepping motors driven in this way will continue its rotation direction when output motion is obstructed. With a preset driving signal in prior art, it is impossible to change the rotation direction under such obstruction conditions. Complicate and costly systems have to be employed to detect the obstruction and change the driving signal such that the motor will rotate in the opposite direction.

OBJECT OF THE INVENTION

An object of the invention is to provide a simple, preferably but not necessarily presettable, and low cost driving method to control the mode of rotation behavior of a two-phase stepping motor.

SUMMARY OF THE INVENTION

According to the invention, there is provided a method of controlling a two-phase stepping motor to operate in one of a plurality of operating modes in which output of the motor behaves differently upon encountering obstacle, comprising the steps of:

generating an electrical driving current comprising a repeating series of a positive active driving region, a first inactive driving region, a negative active driving region and a second inactive driving region;

determining one of the duration of the active driving regions and the duration of the inactive driving regions relative to the other of the durations to thereby cause the motor to operate in a corresponding mode of the operating modes; and applying the driving current to the motor.

Preferably, the determining step comprises adjusting one of the duration of the active driving regions and the duration of the inactive driving regions relative to the other of the durations to thereby cause the motor to change its operation to said corresponding mode from another mode.

More preferably, the operating modes comprise a first mode in which the output of the motor persists in the same direction upon encountering obstacle and a second mode in which the output of the motor reverses direction upon encountering obstacle.

Further more preferably, in the second mode, the output of the motor will self reverse back to the original direction shortly after it reverses direction upon encountering obstacle.

Yet further more preferably, the operating modes include a third mode in which the output of the motor reverses direction upon encountering obstacle and will remain in the reversed direction.

Yet yet further more preferably, the operating modes include a fourth mode in which the output of the motor changes in direction randomly without encountering obstacle.

In a preferred embodiment, the determining step comprises reducing the duration of the active driving regions relative to the duration of the inactive driving regions to change the operation of the motor from the first mode to the second mode.

More preferably, the determining step includes keeping the duration of the inactive driving regions fixed.

In another preferred embodiment, the determining step comprises reducing the duration of the inactive driving regions relative to the duration of the active driving regions to change the operation of the motor from the first mode to the second mode.

More preferably, the determining step includes keeping the duration of the active driving regions fixed.

It is preferred that the control method includes maintaining the durations of the positive and negative active driving regions the same as each other and maintaining the durations of the first and second inactive driving regions the same as each other.

It is preferred that the control method includes maintaining the sum of the duration of the active driving regions and the duration of the inactive driving regions substantially constant to keep a prevailing operating mode.

BRIEF DESCRIPTION OF DRAWINGS

The invention will now be more particularly described, by way of example only, with reference to the accompanying drawings, in which:

FIG. 2b shows the ideal shape of the waveform of FIG. 2a;

FIGS. 5a and 5b are graphs similar to FIG. 4, showing the relationship of the operating modes and the driving current phase durations between low and high driving voltages;

FIGS. 6a and 6b are graphs similar to FIG. 4, showing the relationship of the operating modes and the driving current phase durations between low and high motor loads;

FIG. 8 is a schematic functional block diagram and signal waveforms of a driving circuit for the motor;

FIG. 9 illustrates the output behavior of the motor in a "persistent mode" upon encountering an obstacle;

FIG. 12 illustrates the output behavior of a two-phase stepping motor in a "quiver mode" upon encountering an obstacle.

DETAILED DESCRIPTION OF PREFERRED EMBODIMENT

Figure 1:
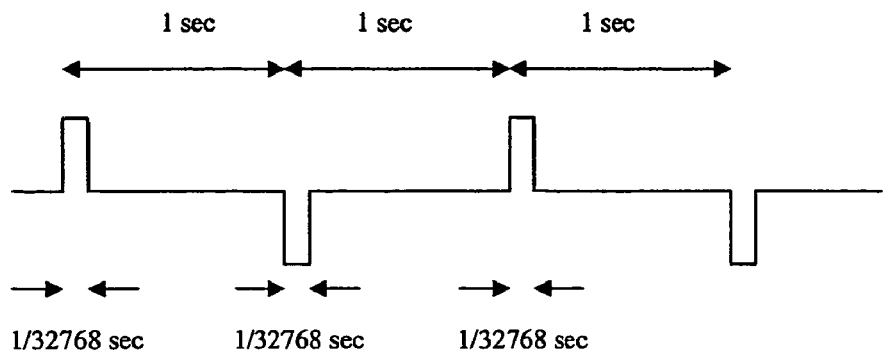
FIG. 1 shows the waveform of a typical driving current for a prior art two-phase stepping motor.
Figure 2A:
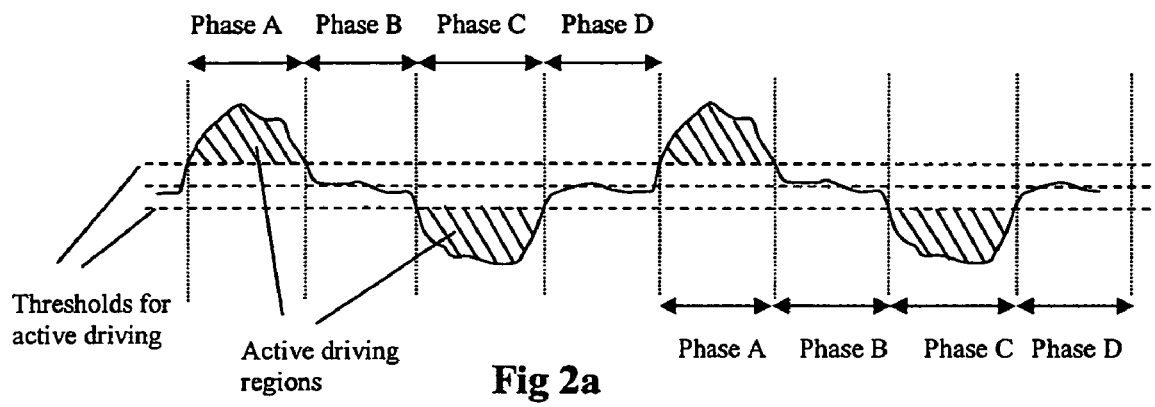
FIG. 2a shows the waveform of a driving current of an embodiment of a method of controlling a two-phase stepping motor, in accordance with the invention, to enter various operating modes.
Figure 2B:
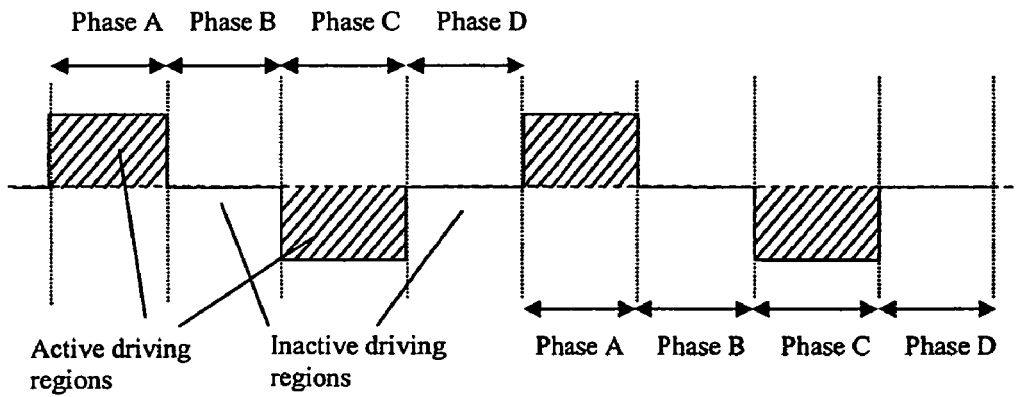

Referring to the drawings, there is illustrated a method of controlling a two-phase stepping motor, embodying the invention, to enter various operating modes in which the output of the motor behaves differently upon encountering obstacle. There are four operating modes as follows:

1. Persistent mode—the motor output persists in the same direction upon encountering obstacle
2. Bounce mode 2—the motor output reverses direction upon encountering obstacle and will self reverse back to the original direction shortly afterwards
3. Bounce mode 1—the motor output reverses direction upon encountering obstacle and will remain in the reversed direction (until next encountering obstacle)
4. Quiver mode—the motor output changes in direction randomly without encountering obstacle The controlling method includes initially the step of generating an electrical driving current for driving the motor. As shown in FIG. 2A (how the waveform may look like in actual practice) and FIG. 2B (the ideal waveform), the motor driving current is periodical and is formed by a repeating series of alternating positive and negative pulses (i.e. "mark") that are spaced apart (i.e. "space") such that the waveform has four phases A, B, C and D.

Phase A is a positive active driving region, phase B is a first inactive driving region between phases A and C, phase C is a negative active driving region, and phase D is a second inactive driving region from the end of phase C to the beginning of phase A of the next cycle. This current waveform is particularly suitable for driving a "one phase on" two-phase stepping motor.

The motor driving current is preferably generated by using a driving circuit 10 of FIG. 8. The driving circuit 10 employs respective pulse width modulators 11 and 12 for the two poles (phases) 21 of the motor 20, and includes a frequency divider 13 based on a system clock for controlling the modulators 11 and 12. The modulators 11 and 12 also receive control from pulse width setting, by means of which the driving circuit 10 is controlled to determine or adjust its output current.

The individual output currents of the modulators 11 and 12 are applied to the motor poles 21 respectively, which then interact and combine with each other via the motor field to produce the motor driving current of effectively the desired waveform.

The controlling method includes the step of determining one of the duration of the active driving regions A and C and the duration of the inactive driving regions B and D relative to the other of the durations to thereby cause the motor to operate in a corresponding mode of the operating modes.

Figure 3A:
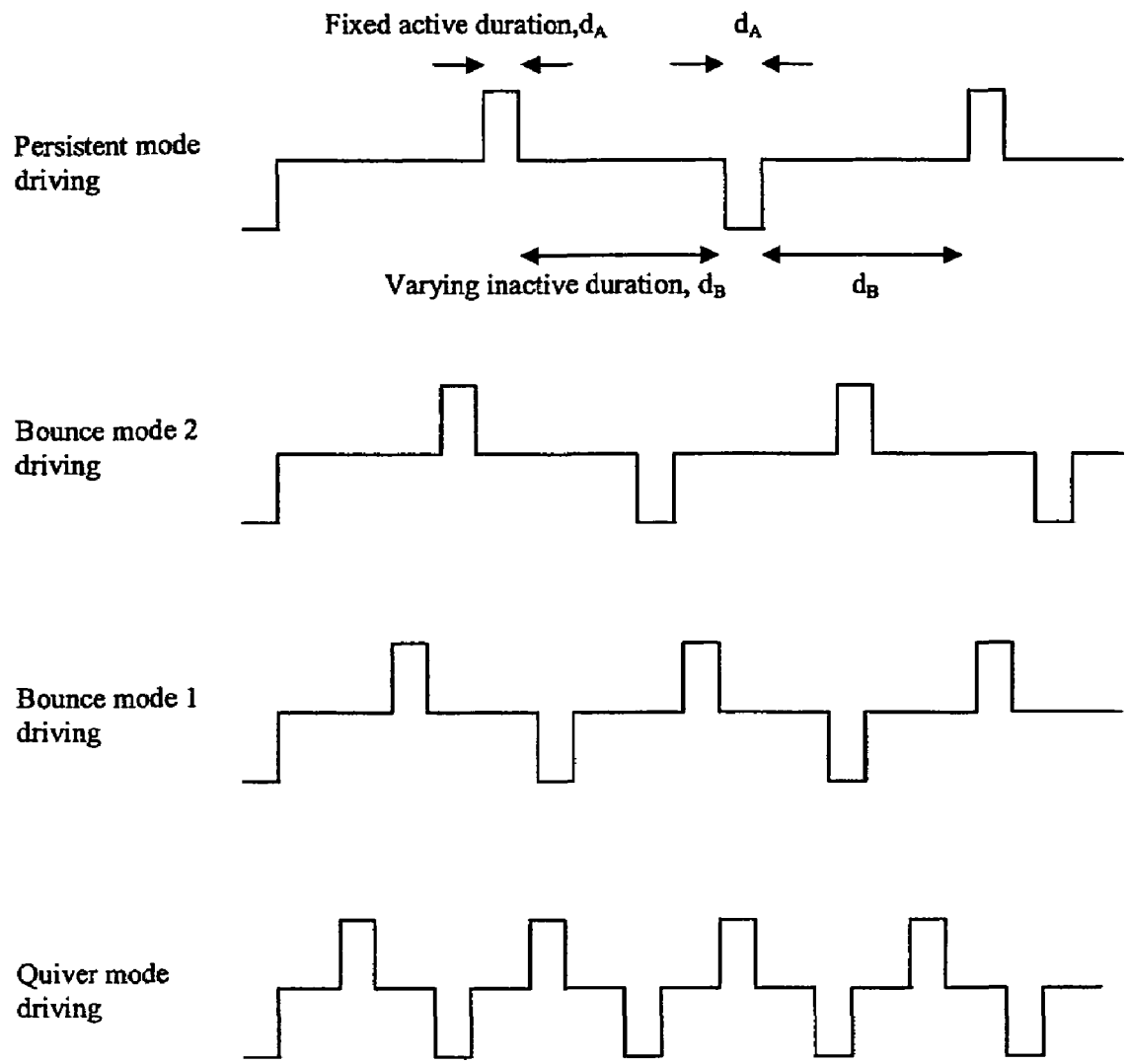
FIG. 3a shows varying waveforms of a driving current having a fixed active phase duration $d_A$ and a variable inactive phase duration $d_B$ to operate the motor in the various modes.
Figure 3B:
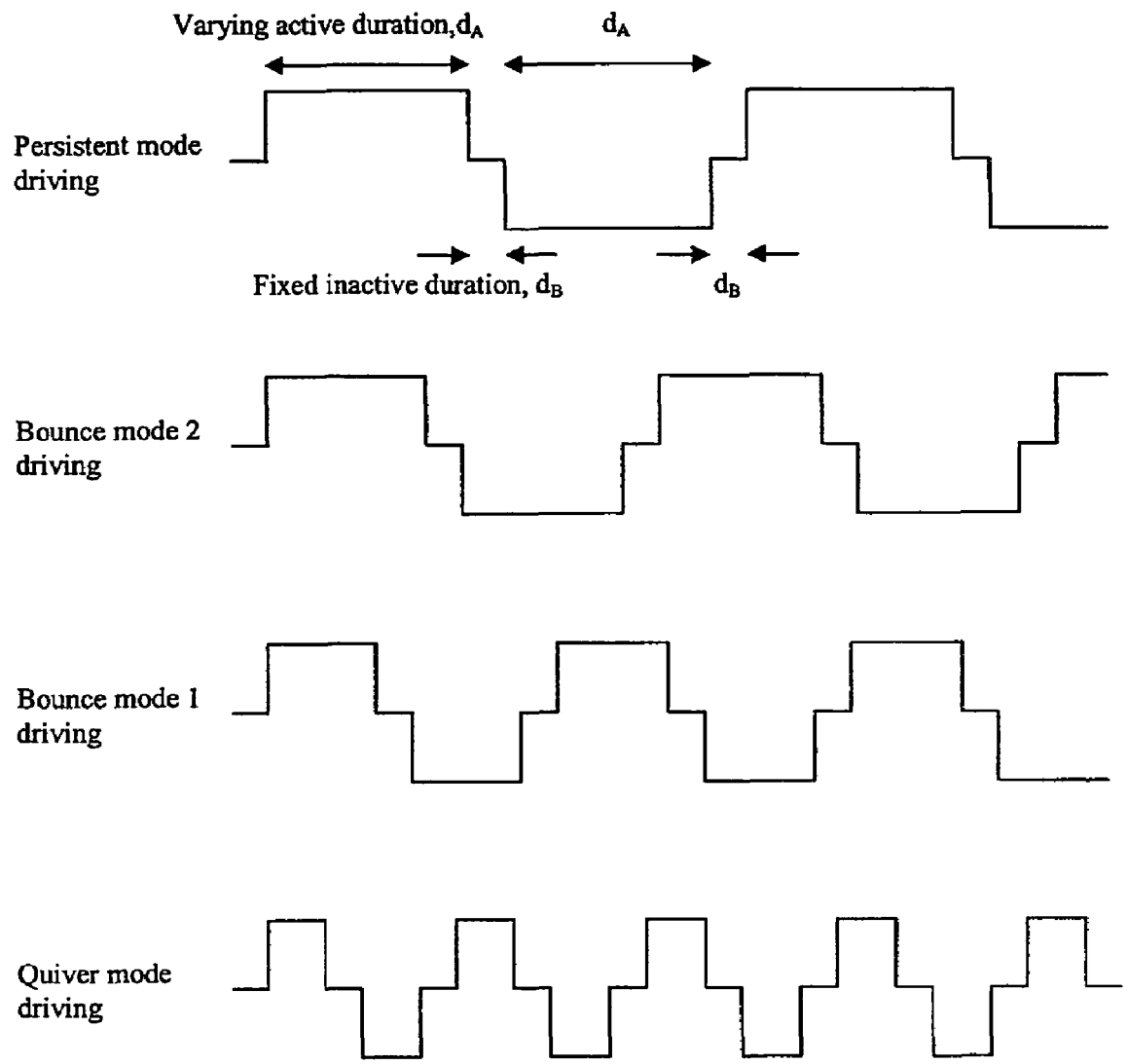
FIG. 3b shows varying waveforms of another driving current having a fixed inactive phase duration $d_b$ and a variable active phase duration $d_A$ to operate the motor in the various modes.

A symmetrical driving current is preferred for simplicity in generation and manipulation, where the duration of phase A equals that of phase C and the duration of phase B equals that of phase D. By reducing the duration of the inactive driving phases B and D relative to that of the active driving phases A and C (kept fixed) as illustrated in FIG. 3a, or reducing the duration of the active driving phases A and C relative to that of the inactive driving phases B and D (kept fixed) as illustrated in FIG. 3b, the output behavior of the motor will be switched from the persistent mode to the bounce mode 2, and then to bounce mode 1 and finally to the quiver mode as shown in FIG. 4.

Figure 4:
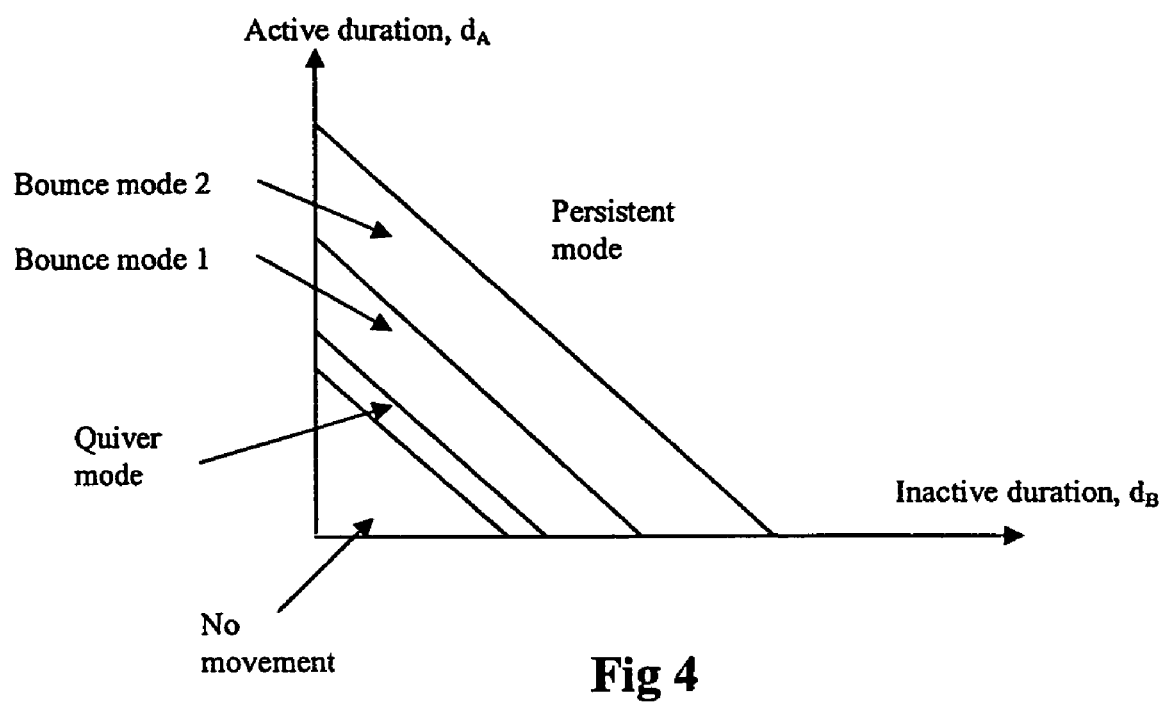
FIG. 4 is a graph showing the relationship between the driving current phase durations and the operating modes.

It should be noted, as can be deduced from FIG. 4, that the operating mode will remain the same when the sum of duration $d_A$ phase A/C (i.e. "mark" width) and duration $d_B$ of phase B/D (i.e. "space" width) is approximately constant:

$$d_A + d_B = \text{constant}$$

By maintaining the sum of the active and inactive driving durations substantially constant, it is possible to lengthen the active driving duration (with corresponding shortening of the inactive driving duration) to increase the output power of the motor, whilst keeping the prevailing mode of operation.

Figure 7:
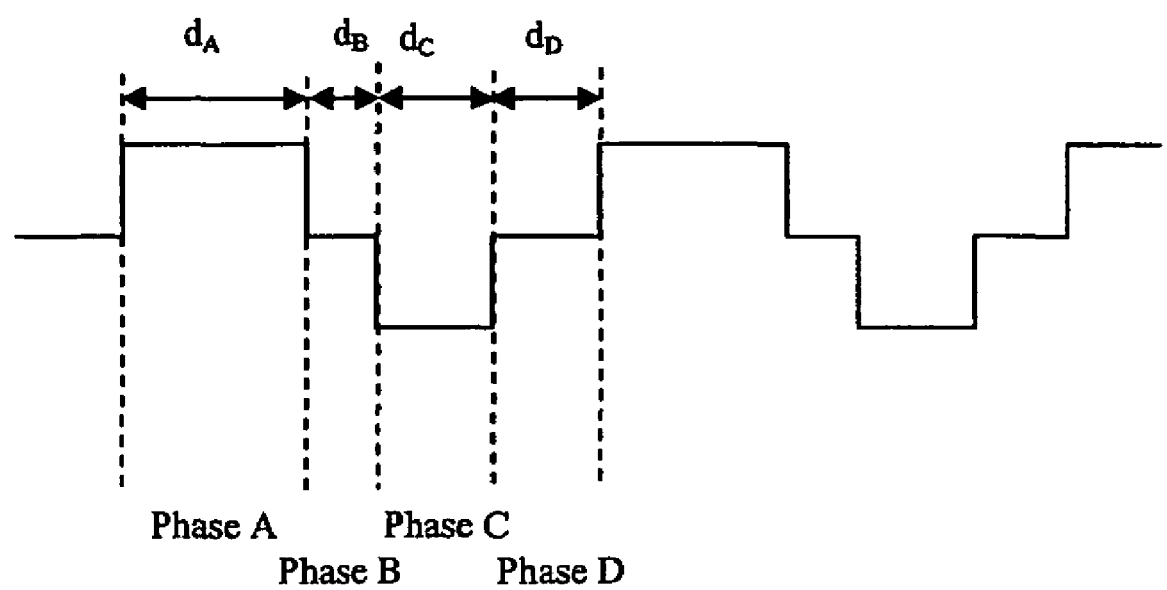
FIG. 7 shows the waveform of an asymmetrical driving current.

The motor driving current may be asymmetrical for the two poles/phases of the motor, in that the duration of phase A may be different from that of phase C, or the duration of phase B may differ from that of phase D, as illustrated by the waveform of FIG. 7. If the sum of durations of phases A and B is larger than that of phases C and D, the durations of phases A and B will be dominant and determine the operating mode of the motor, and vice versa. In the example of FIG. 7, since the duration of phases A and B is greater than that of phases C and D, the motor will operate in the mode as determined by the relative duration between phase A and phase B of the driving current.

The "mark" width (i.e. the width of the active driving region A/C) and/or the "space" width (i.e. the width of the inactive driving regions B/D, or from the falling edge of one active driving region to the rising edge of the next active driving region) may be adjusted relative to the other width, with the other width preferably fixed for simplicity, in a controlled manner to determine the behavior of the output or operation of the motor.

While operating in the persistent mode, the two-phase stepping motor tends to rotate in the same direction upon encountering an obstacle, e.g. when the rotary motion is obstructed, as illustrated in FIG. 9.

Figure 10A:
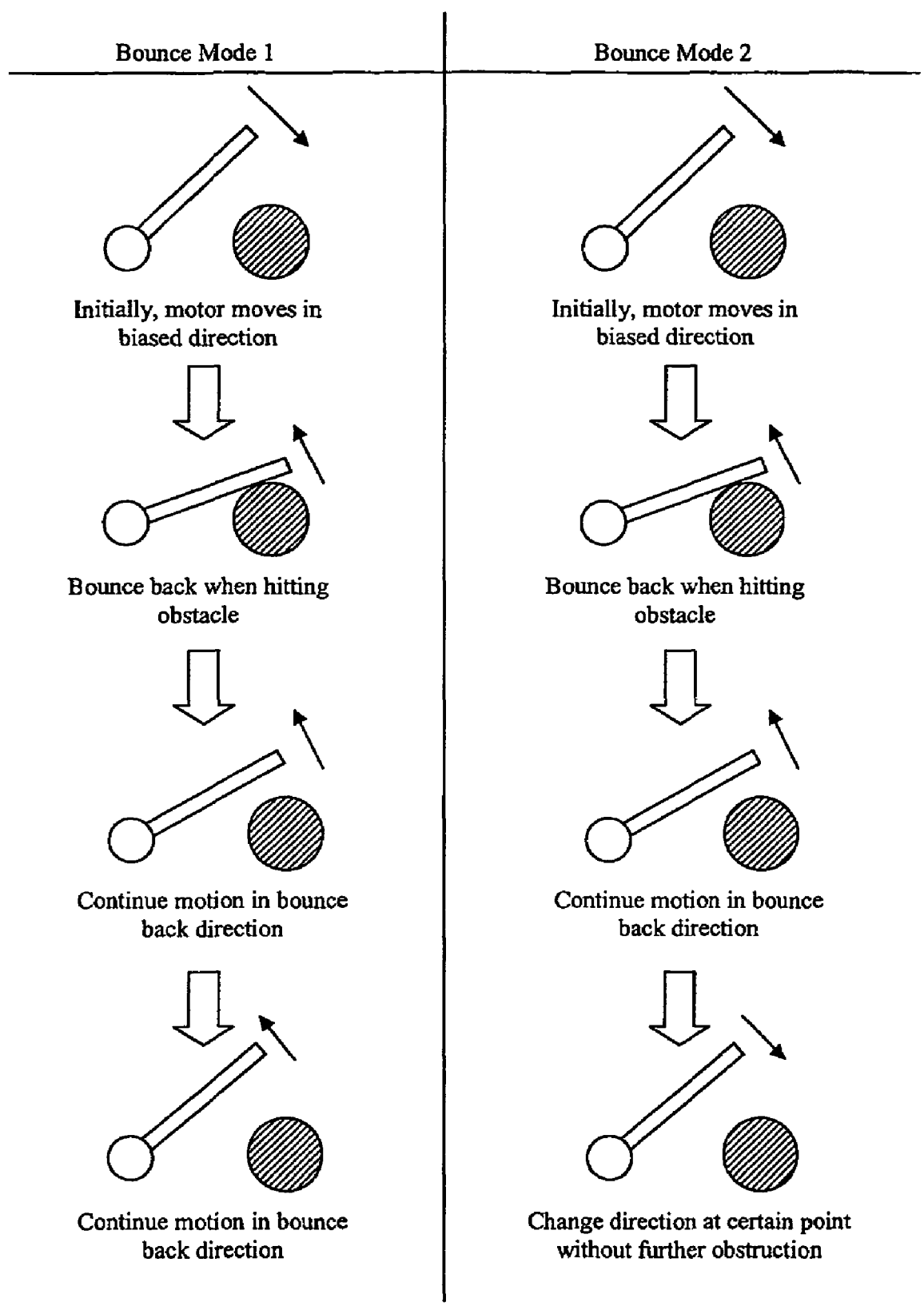
FIG. 10a illustrates the output behavior of a biased two-phase stepping motor in "bounce mode 1" and "bounce mode 2" upon encountering an obstacle in the biased direction.
Figure 10B:
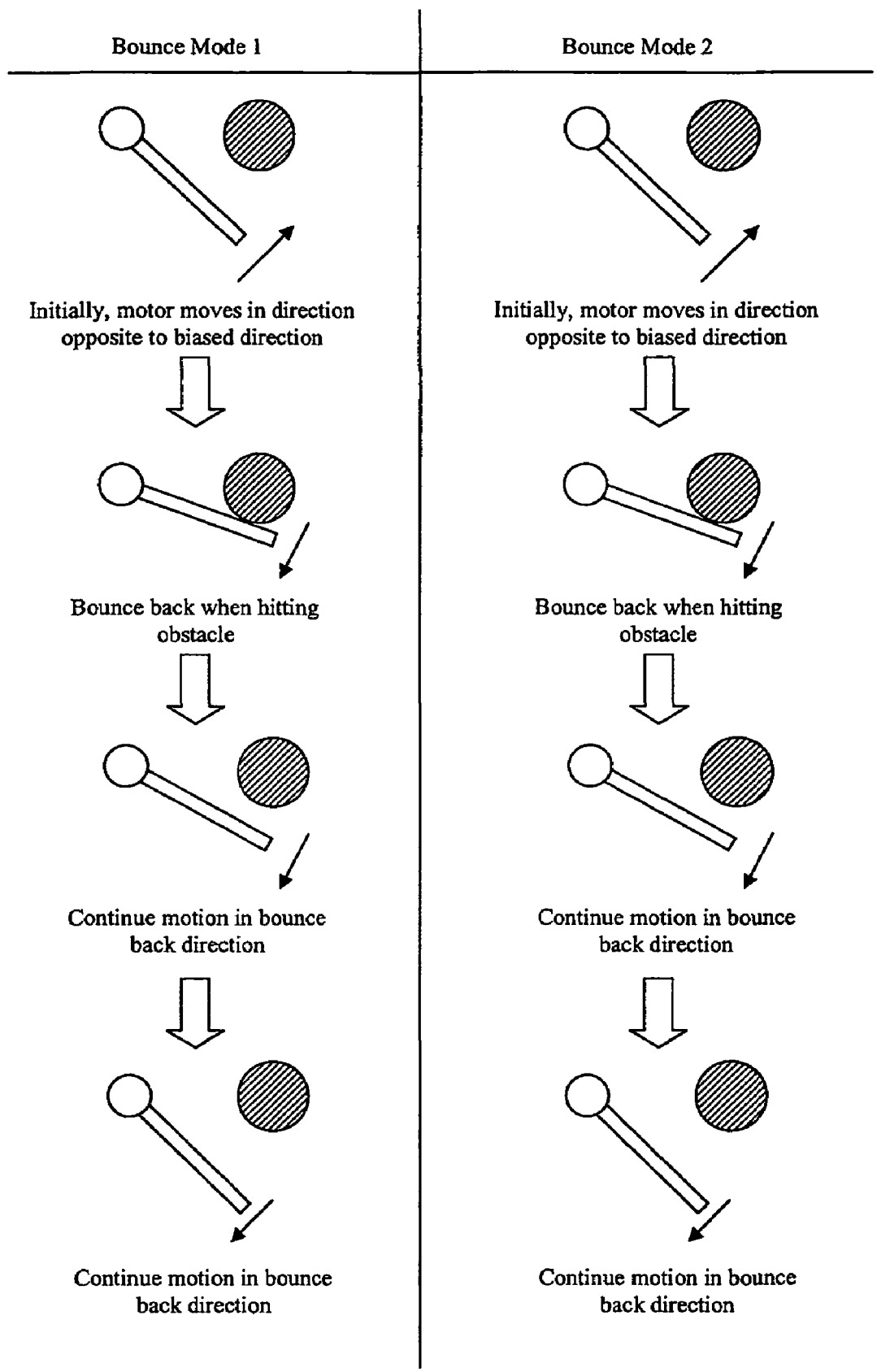
FIG. 10b illustrates the output behavior of the biased two-phase stepping motor in "bounce mode 1" and "bounce mode 2" upon encountering an obstacle in a direction opposite to the biased direction.
Figure 11:
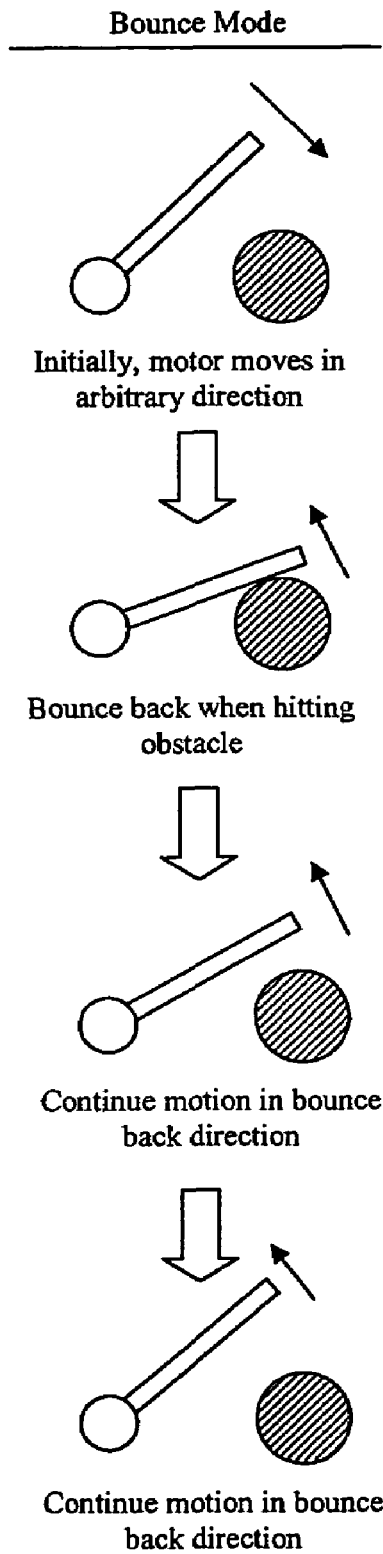
FIG. 11 illustrates the output behavior of an unbiased two-phase stepping motor in a single "bounce mode" upon encountering an obstacle.

While operating in the bounce mode, the motor rotates in the opposite direction when the rotary motion is obstructed, as illustrated in FIG. 11. In particular, for a biased two-phase stepping motor, the bounce mode can be further divided into two sub-modes: bounce mode 1 and bounce mode 2, and the motor output behavior is illustrated in FIGS. 10a and 10b.

In FIG. 10a, upon encountering an obstacle in the biased direction, the motor immediately reverses direction and will remain in the reversed direction until next encountering obstacle—bounce mode 1. During bounce mode 2 operation, upon encountering an obstacle in the biased direction, the motor immediately reverses direction and will self reverse back to the original direction shortly afterwards.

In FIG. 10b, upon encountering an obstacle in the direction opposite to the biased direction, the motor immediately reverses direction and will remain in the reversed direction (i.e. the biased direction) until next encountering obstacle. The same output behavior occurs in either bounce mode 1 or bounce mode 2.

While operating in the quiver mode, the two-phase stepping motor rotates in a quivering manner with arbitrary or random changes in the output directions, as illustrated in FIG. 12, without encountering obstacle.

The variation in the magnitude of the driving current or in the motor loading will shift the region of operating modes as illustrated in FIGS. 5a, 5b, 6a and 6b. In particular, a higher driving (i.e. larger driving current) or a lighter load (i.e. smaller motor loading) will restrict the region within which the various operating modes are possible or achievable towards the origin. Such an effect can be compensated by suitable adjustment in the active and/or inactive driving phase durations.

One of the methods to determine the "mark" width and "space" width for the various operating modes is described below, using the driving circuit of FIG. 8.

1. Firstly, a biased two-phase stepping motor is driven by a typical driving current in prior art as illustrated in FIG. 1.

2. An obstacle is inserted to block the rotary motion of the motor. In the persistent mode, the motor tends to rotate in the original direction.

3. The driving signal duty cycle (i.e. the mark-to-space ratio) is gradually reduced until a point where the motor rotation starts to bounce back and the motor enters the bounce mode, first into bounce mode 2 and then bounce mode 1.

4. The width of the active driving current pulses (i.e. phases A and C) is further reduced until a point where the motor output starts to quiver or change direction arbitrarily or randomly even without encountering an obstacle, whereby the motor now enters the quiver mode and random rotation results.

One of the applications of the subject control method is in toys and in particular toy cars. When a biased two-phase stepping motor is employed in a toy car and it is driven in the bounce mode (e.g. bounce mode 1), the toy car will change its direction after colliding with an obstacle. When driven in "quiver mode", the toy car will demonstrate a trembling motion and appear as the engine is about to break down.

The invention provides a simple solution to control the output behavior of a two-phase stepping motor especially for toys, and no additional mechanism to detect obstacle or collision is required.

TABLE 1A

Experimental data about the phase durations to enter the operating modes by fixing the active duration $d_A$ and varying the inactive duration $d_B$, corresponding to FIG. 3a, with the driving voltage being fixed at 3 V:

| Phase A duration $d_A$ | Phase B duration | | | |
|---|---|---|---|---|
| | $d_{B0}$, enter quiver mode from no movement | $d_{B1}$, enter bounce mode from quiver mode | $d_{B1a}$, enter bounce mode 2 from bounce mode 1 | $d_{B2}$, enter persistent mode from bounce mode 2 |
| 4.9 ms | 7.3 ms | 9.8 ms | 34.2 ms | 48.8 ms |
| 7.3 ms | 4.9 ms | 7.3 ms | 24.4 ms | 43.9 ms |
| 9.8 ms | 2.4 ms | 4.9 ms | 17.1 ms | 41.5 ms |

TABLE 1B

Experimental data about the phase durations to enter the operating modes by fixing the inactive duration $d_B$ and varying the active duration $d_A$, corresponding to FIG. 3b, with the driving voltage being fixed at 3 V:

| Phase B duration $d_B$ | Phase A duration | | | |
|---|---|---|---|---|
| | $d_{A0}$, enter quiver mode from no movement | $d_{A1}$, enter bounce mode from quiver mode | $d_{A1a}$, enter bounce mode 2 from bounce mode 1 | $d_{A2}$, enter persistent mode from bounce mode 2 |
| 2.4 ms | 9.8 ms | 12.2 ms | 26.8 ms | 36.6 ms |
| 4.9 ms | 7.3 ms | 9.8 ms | 22.0 ms | 31.7 ms |
| 7.3 ms | 4.9 ms | 7.3 ms | 17.1 ms | 29.3 ms |

TABLE 2

Experimental data about the driving voltage and the "mark" width to enter the operating modes by a symmetrical driving current, corresponding to FIGS. 5a and 5b, with the phase B duration being fixed at 9.8 ms:

| Driving Voltage | Phase A duration | | | |
|---|---|---|---|---|
| | $d_{A0}$, enter quiver mode from no movement | $d_{A1}$, enter bounce mode from quiver mode | $d_{A1a}$, enter bounce mode 2 from bounce mode 1 | $d_{A2}$, enter persistent mode from bounce mode 2 |
| 2 V | 7.3 ms | 9.8 ms | 17.1 ms | 39.0 ms |
| 3 V | 4.9 ms | 7.3 ms | 17.1 ms | 29.3 ms |
| 5 V | 2.4 ms | 4.9 ms | 9.8 ms | 19.5 ms |

TABLE 3

Experimental data about the motor loading and the "mark" width to enter the operating modes by a symmetrical driving current, corresponding to FIGS. 6a and 6b, with the phase B duration being fixed at 9.8 ms and the driving voltage at 3 V:

| Motor loading | Phase A duration | | | |
|---|---|---|---|---|
| | $d_{A0}$, enter quiver mode from no movement | $d_{A1}$, enter bounce mode from quiver mode | $d_{A1a}$, enter bounce mode 2 from bounce mode 1 | $d_{A2}$, enter persistent mode from bounce mode 2 |
| Unloaded | 4.9 ms | 7.3 ms | 17.1 ms | 29.3 ms |
| Loaded | 7.3 ms | 9.8 ms | 24.4 ms | 46.4 ms |

The invention has been given by way of example only, and various modification of and/or alterations to the described embodiment may be made by persons skilled in the art without departing from the scope of the invention.

The invention claimed is:

1. A method of controlling a two-phase stepping motor to operate in one of a plurality of operating modes in which output of the motor behaves differently upon encountering obstacle, comprising the steps of:

generating an electrical driving current comprising a repeating series of a positive active driving region, a first inactive driving region, a negative active driving region and a second inactive driving region;

determining one of the duration of the active driving regions and the duration of the inactive driving regions relative to the other of the durations to thereby cause the motor to operate in a corresponding mode of the operating modes; and applying the driving current to the motor.

2. The control method as claimed in claim 1, wherein the determining step comprises adjusting one of the duration of the active driving regions and the duration of the inactive driving regions relative to the other of the durations to thereby cause the motor to change its operation to said corresponding mode from another mode.

3. The control method as claimed in claim 2, wherein the operating modes comprise a first mode in which the output of the motor persists in the same direction upon encountering obstacle and a second mode in which the output of the motor reverses direction upon encountering obstacle.

4. The control method as claimed in claim 3, wherein, in the second mode, the output of the motor will self reverse back to the original direction shortly after it reverses direction upon encountering obstacle.

5. The control method as claimed in claim 4, wherein the operating modes include a third mode in which the output of the motor reverses direction upon encountering obstacle and will remain in the reversed direction.

6. The control method as claimed in claim 5, wherein the operating modes include a fourth mode in which the output of the motor changes in direction randomly without encountering obstacle.

7. The control method as claimed in claim 3, wherein the determining step comprises reducing the duration of the active driving regions relative to the duration of the inactive driving regions to change the operation of the motor from the first mode to the second mode.

8. The control method as claimed in claim 7, wherein the determining step includes keeping the duration of the inactive driving regions fixed.

9. The control method as claimed in claim 3, wherein the determining step comprises reducing the duration of the inactive driving regions relative to the duration of the active driving regions to change the operation of the motor from the first mode to the second mode.

10. The control method as claimed in claim 9, wherein the determining step includes keeping the duration of the active driving regions fixed.

11. The control method as claimed in claim 1, including maintaining the durations of the positive and negative active driving regions the same as each other and maintaining the durations of the first and second inactive driving regions the same as each other.

12. The control method as claimed in claim 1, including maintaining the sum of the duration of the active driving regions and the duration of the inactive driving regions substantially constant to keep a prevailing operating mode.

\* \* \* \* \*